(12) United States Patent
Smith et al.

(10) Patent No.: US 11,128,944 B2
(45) Date of Patent: Sep. 21, 2021

(54) PROXIMITY DETECTING HEADPHONE DEVICES

(71) Applicants: Patricia Williams Smith, Collierville, TN (US); Neva Thompson, Charlotte, TN (US); Carl Edward Williams, Collierville, TN (US); Kelvin DeWayne King, Collierville, TN (US)

(72) Inventors: Patricia Williams Smith, Collierville, TN (US); Neva Thompson, Charlotte, TN (US); Carl Edward Williams, Collierville, TN (US); Kelvin DeWayne King, Collierville, TN (US)

( * ) Notice: Subject to any disclaimer, the term of this patent is extended or adjusted under 35 U.S.C. 154(b) by 0 days.

(21) Appl. No.: 16/676,143

(22) Filed: Nov. 6, 2019

(65) Prior Publication Data

US 2020/0267468 A1   Aug. 20, 2020

Related U.S. Application Data

(60) Provisional application No. 62/806,975, filed on Feb. 18, 2019.

(51) Int. Cl.
| | |
|---|---|
| *H04R 1/10* | (2006.01) |
| *G01S 17/04* | (2020.01) |
| *H04N 5/33* | (2006.01) |
| *G01S 17/08* | (2006.01) |
| *G06F 3/16* | (2006.01) |
| *G01S 17/86* | (2020.01) |

(Continued)

(52) U.S. Cl.
CPC ............ *H04R 1/1041* (2013.01); *G01S 17/04* (2020.01); *G01S 17/08* (2013.01); *G06F 3/165* (2013.01); *H04N 5/33* (2013.01); *H04R 1/1008* (2013.01); *H04R 1/1016* (2013.01)

(58) Field of Classification Search
None
See application file for complete search history.

(56) References Cited

U.S. PATENT DOCUMENTS

2007/0121959 A1* 5/2007 Philipp ............... H04R 1/1041
381/74
2012/0212399 A1* 8/2012 Border .................. G06F 3/005
345/8

(Continued)

*Primary Examiner* — Qin Zhu

(57) ABSTRACT

A proximity detecting headphone device is provided, with a proximity sensor, plurality of output devices, data store having predetermined heat signatures, and a control circuit communicatively coupled to the proximity sensor, output device, and data store. The control circuit is configured to: capture, via the proximity sensor, proximity data within a threshold distance of the proximity detecting headphone device; determine, using the proximity data, a presence of a person within the threshold distance; generate an audio notification when the presence of the person within the threshold distance is determined; and transmit, via the plurality of output devices, the audio notification. The proximity detecting headphone device communicates with a computing device. The proximity sensor comprises a laser rangefinder that captures time-of-flight data. The predetermined heat signatures comprise the heat signatures of vehicles and persons. The proximity detecting headphone device includes a communications device used to communicate with the computing device.

1 Claim, 9 Drawing Sheets

(51) Int. Cl.
*H04R 5/033* (2006.01)
*H04R 27/00* (2006.01)

(56) References Cited

U.S. PATENT DOCUMENTS

| | | | | |
|---|---|---|---|---|
| 2012/0320215 | A1* | 12/2012 | Maddi | H04N 5/33 |
| | | | | 348/155 |
| 2017/0188129 | A1* | 6/2017 | Sindia | H03G 3/3005 |
| 2018/0048750 | A1* | 2/2018 | Hardi | B62D 1/04 |
| 2018/0175944 | A1* | 6/2018 | Seyed | H04W 52/283 |
| 2018/0364483 | A1* | 12/2018 | Mallinson | G02B 30/50 |
| 2018/0364485 | A1* | 12/2018 | Mallinson | G09G 3/346 |
| 2019/0182415 | A1* | 6/2019 | Sivan | H04W 4/80 |

\* cited by examiner

PROXIMITY DETECTING HEADPHONE DEVICES

CROSS-REFERENCE TO RELATED APPLICATIONS

This application claims priority to U.S. Provisional Application No. 62/806,975 filed Feb. 18, 2019, which is hereby incorporated herein by reference.

FIELD OF THE INVENTION

The present disclosure relates generally to headphone devices. More specifically, the present disclosure describes proximity detecting headphone devices.

BACKGROUND OF THE INVENTION

"Headphones" traditionally refer to a pair of small loudspeaker drivers worn on or around the head over a user's ears. As used herein, headphones also refer to individual units that plug into the user's ear canal (e.g., earbuds). Headphones utilize electroacoustic transducers to convert electrical signals to corresponding sounds. In certain situations, users may inadvertently put themselves in danger when wearing headphones. Examples included stepping out into road traffic, bumping into another pedestrian or not hearing people approaching from the rear.

Even more, mishaps due to headphone distraction will likely increase as the rate of headphone use increases. An increase in the situational awareness is typically associated with an increase in the perception of environmental elements and events with respect to space or time. In the same vein, situational awareness is usually recognized as a critical foundation for successful decision-making across a broad range of situations and is recognized as a primary factor in accidents attributed to human error. A proximity sensor is a sensor able to detect the presence of nearby objects without any physical contact.

BRIEF DESCRIPTION OF THE DRAWINGS

Some of the embodiments will be described in detail, with reference to the following figures, wherein like designations denote like members, wherein.

Figure 1:
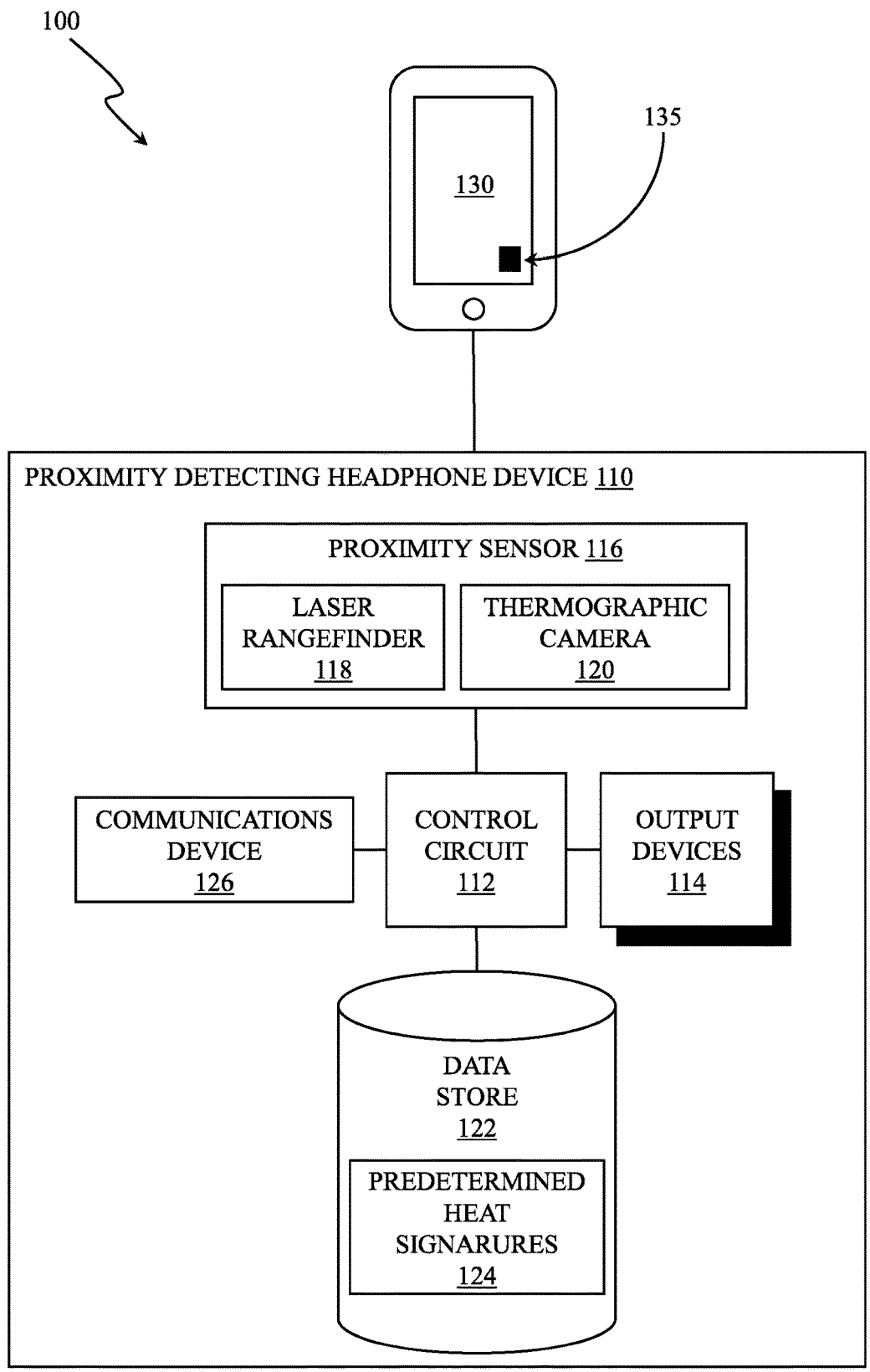
FIG. 1 depicts an environment for detecting proximity via a proximity detecting headphone device according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

The present disclosure includes many aspects and features. Moreover, while many aspects and features relate to, and are described in the context of detection of presence of one or more intruder devices, embodiments of the present disclosure are not limited to use only in this context.

"Headphones" traditionally refer to a pair of small loudspeaker drivers worn on or around the head over a user's ears. As used herein, headphones also refer to individual units that plug into the user's ear canal (e.g., earbuds). Headphones utilize electroacoustic transducers to convert electrical signals to corresponding sounds. In certain situations, users may inadvertently put themselves in danger when wearing headphones. Examples included stepping out into road traffic, bumping into another pedestrian or not hearing people approaching from the rear. Even more, mishaps due to headphone distraction will likely increase as the rate of headphone use increases. An increase in the situational awareness is typically associated with an increase in the perception of environmental elements and events with respect to space or time. In the same vein, situational awareness is usually recognized as a critical foundation for successful decision-making across a broad range of situations and is recognized as a primary factor in accidents attributed to human error. A proximity sensor is a sensor able to detect the presence of nearby objects without any physical contact.

The instant disclosure seeks to provide proximity detecting headphone devices according to some embodiments. FIG. 1 depicts an environment, generally 100, for detecting proximity via a proximity detecting headphone device according to some embodiments. Environment 100 includes proximity detecting headphone device ("PDHD") 110 communicatively coupled (e.g., wired or wireless communication) to computing device 130. For example, computing device 130 is a mobile computing device (e.g., laptop computer, handheld computer, wearable computing device, cellular phone, smartphone, smart device, tablet computer, or other computing devices small enough to hold and operate in the hand. In some embodiments, computing device 130 can connect to the Internet and interconnect with other devices, such as PDHD 110, via Wi-Fi, Bluetooth, cellular networks or near field communication (NFC).

PDHD 110 includes one or more proximity sensors 116, output devices 114, and data store 122, and communications device 126 all interconnected via control circuit 112. In some embodiments, PDHD 110 can be a pair of small loudspeaker drivers worn on or around the head over a user's (e.g., user 200) ears. In other embodiments, PDHD 110 can be individual units that plug into the user's ear canal (e.g., earbuds). PDHD 110 receives signals from computing device 130, converts the signal to corresponding audio and transmits (i.e. plays) the audio through electroacoustic transducers or speakers (e.g., output devices 114). In certain embodiments, PDHD 110 uses communications device 126 to communicate with computing device 130 using one or more wireless communications protocols (e.g. Wi-Fi, Bluetooth, a cellular network protocol, near field communication protocol, or similar wireless communications protocols). In general, communications device 126 sends and receives wireless communications with computing device 130.

Figure 2:
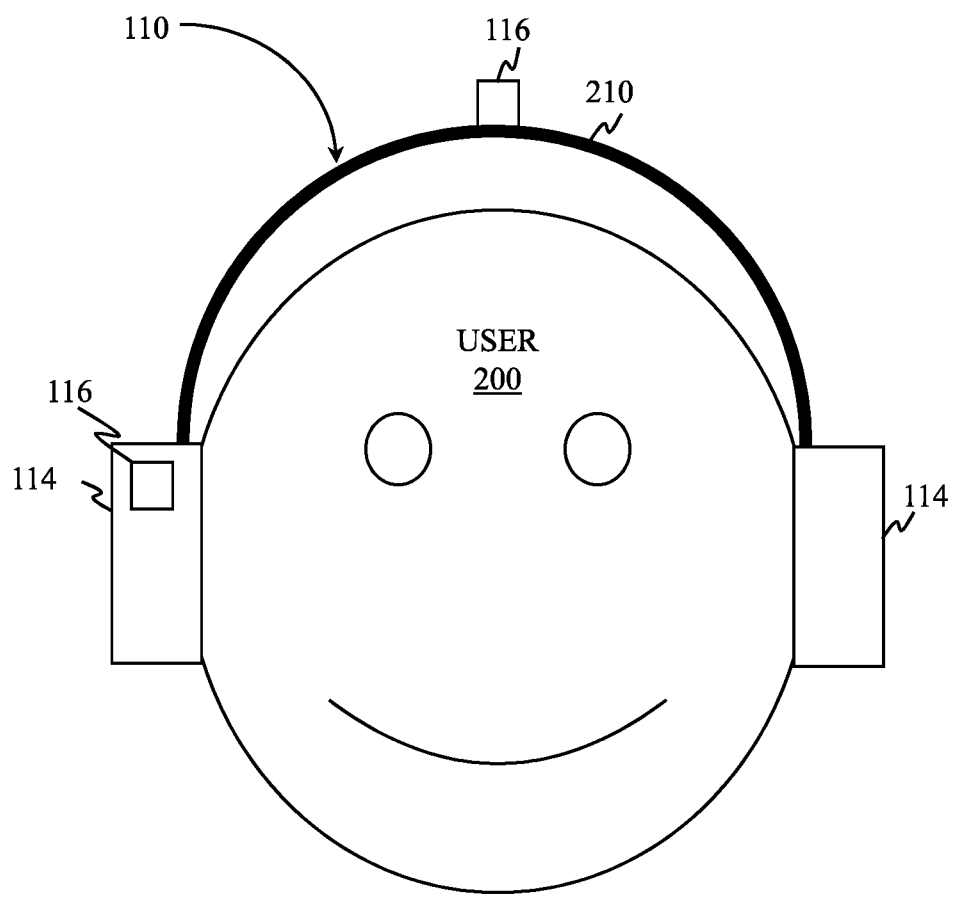
FIG. 2 illustrates a user wearing the proximity detecting headphone device according to some embodiments.

Proximity sensor 116 detects the presence of nearby objects without any physical contact. Proximity sensor 116 captures proximity data about object within a threshold distance (e.g., threshold distance 300) of PDHD 110. As used herein, "proximity data" is data that quantifies an objects distance from PDHD 110. FIG. 2 illustrates user 200 wearing PDHD 110 according to some embodiments. In embodiments where PDHD 110 are in the form of a pair of over the-ear headphones, PDHD 110 comprises band 210 positioned over the head of user 200 and each copy of output device 114 positioned proximate to an end of band 210. Here, proximity sensor 116 is positioned proximate to band 210, in accordance with some embodiments. In other embodiments, proximity sensor 116 is positioned adjacent to output devices 114. Proximity sensor 116 includes one or more copies of laser rangefinder 118 and/or thermographic camera 120.

Laser rangefinder 118 uses a laser beam to determine the distance to an object. For example, laser rangefinder 118 generates time of flight data by sending laser pulses in narrow beams towards objects and measuring the time taken by the pulses to be reflected off the target and returned to the sender. Thermographic camera 120 generate thermographic images of objects positioned with threshold distance 300. Data store 122 is an information repository that includes predetermined heat signatures 124. For example, the predetermined heat signatures 124 can includes heat signatures of one or more motor vehicles (e.g., cars, trucks, motorcycles, etc.), persons (e.g., adults, children, men, women, etc.), non-human mammals (e.g., cats, dogs, squirrels, birds, etc.), etc. Control circuit 112 is configured to perform one or all of the methods, processes, functions, and/or steps disclosed herein.

Figure 3:
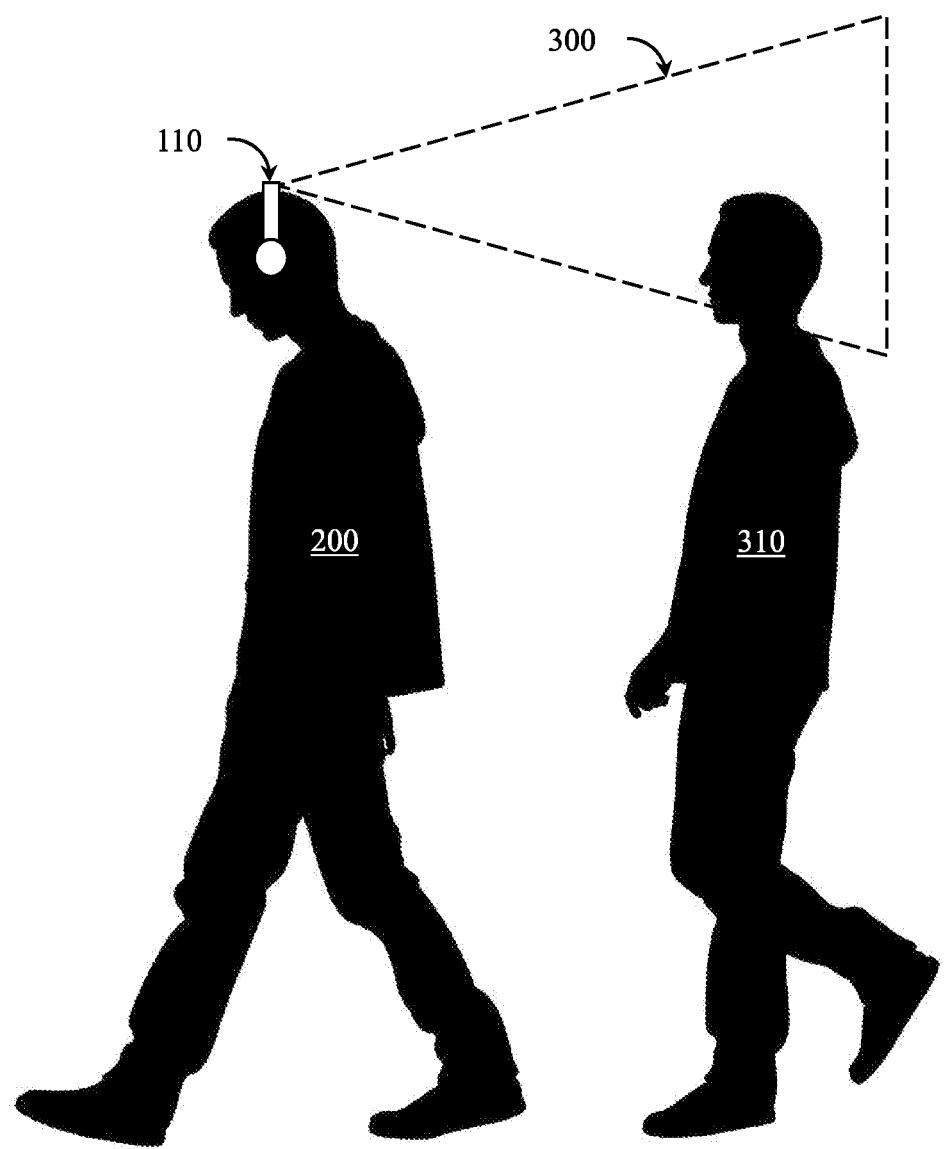
FIG. 3 depicts a side view of an operational process of the proximity sensing headphone device according to some embodiments.
Figure 4:
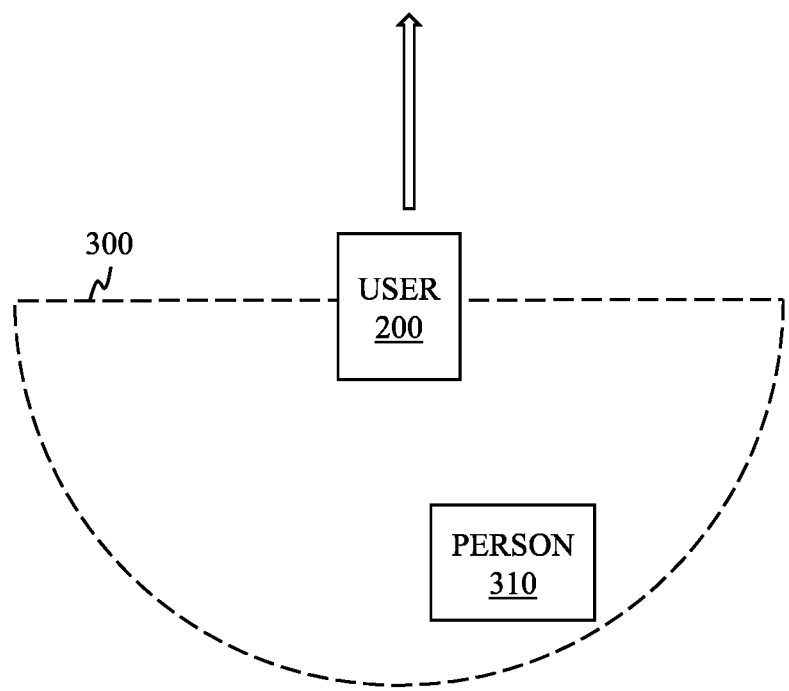
FIG. 4 illustrates a top view of the operation process of FIG. 3 according to some embodiments.

FIG. 3 depicts a side view of an operational process of PDHD 110 according to some embodiments. Here, while walking, user 200 wears PDHD 110 and PDHD 110 scans threshold distance 300, within which person 310 is positioned. FIG. 4 illustrates a top view of the operational process of FIG. 3 according to some embodiments. Here, the arrow reflects the general direction that user 200 traverses.

Figure 5:
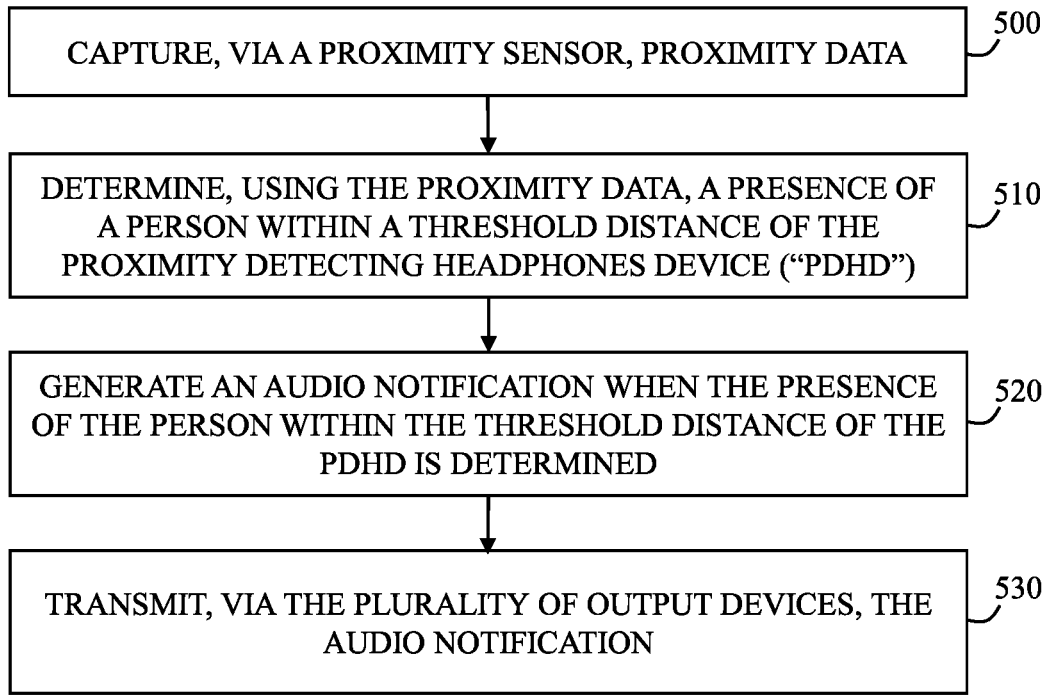
FIG. 5 depicts exemplary operational steps of the proximity detecting headphone device according to certain embodiments.

In certain embodiments, PDHD 110 performs one or more of the depicted processes in predetermined intervals and/or continuously. FIG. 5 depicts exemplary operational steps of PDHD 110 according to certain embodiments. At step 500, proximity sensor 116 captures proximity data within threshold distance 300. For example, proximity sensor 116 can be calibrated to capture proximity data within any threshold distance relative to PDHD 110 (e.g., 1 foot, 1 meter, 1 yard, etc.). In some embodiments, threshold distance 300 refers to an interpersonal distance, e.g., an intimate distance (e.g., 1-18 inches), personal distance (e.g., 1.5-4 feet), social distance (e.g., 4-12 feet), and public distance (e.g., 12-20 feet). At step 510, the proximity data is used to determine a presence of person 310 within threshold distance 300. At step 520, an audio notification is generated when the presence of person 310 within the threshold distance is determined.

For example, the audio notification can include a beep, chirp, tone, or similar sound. Audio notifications can include a statement of the intrusion, for example, "intruder alert!", "danger!", "threat detected!" and/or similar alerting statements. At step 530, the audio notification is transmitted via output devices 114. In other embodiments, the notification is generated when any moving object (e.g., vehicle, human, non-human mammal, or a combination of two or more thereof) is detected within threshold distance 300. In still other embodiments, the notification can be transmitted to computing device 130 for conveyance via user interface 135, which is associated with PDHD 110. For example, the user interface can be included in a mobile application ("app") downloaded on to computing device 130. For example, user interface 135 can allow users to control one or more aspects of PDHD 110.

Figure 6:
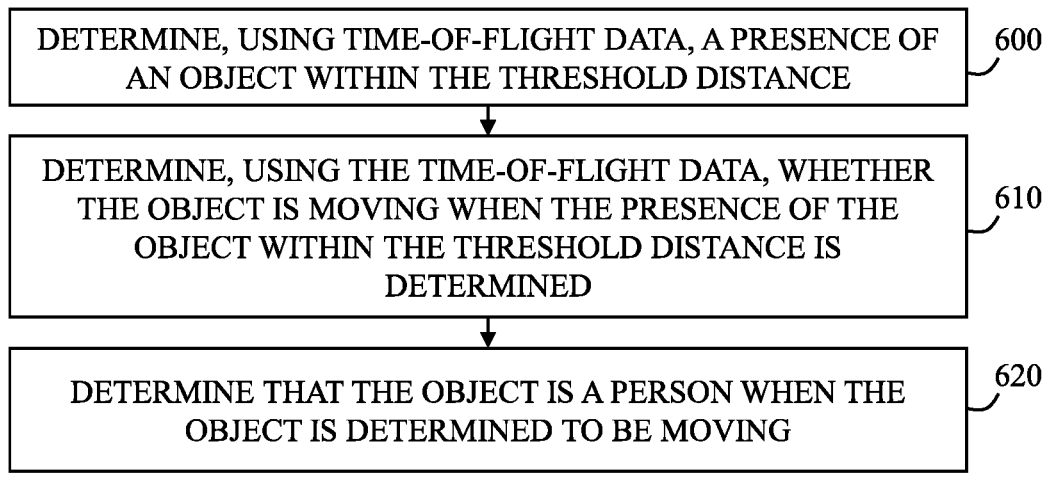
FIG. 6 illustrates exemplary operational steps of the proximity detecting headphone device according to other embodiments.

In certain embodiments, time-of-flight data is used to determine the proximity of objects and determine movement of such objects. FIG. 6 illustrates exemplary operational steps of PDHD 110 according to other embodiments. Specifically, FIG. 6 illustrates a method to perform step 510. At step 600, the time-of-flight data is used to determine a presence of an object (e.g., person 310) within threshold distance 300 according to certain embodiments. For example, laser rangefinder 118 transmits light pulses towards person 310 and measures the return time to generate time-of-flight data. At step 610 when the presence of the object within threshold distance 300 is determined, the time-of-flight data is used to determine whether the object is moving according to other embodiments. For example, movement can be determined using Doppler effect techniques to determine whether the object is moving towards or away from laser rangefinder 118. At step 620, the object is determined to be a person when the object is determined to be moving or in motion relative to user 200.

Figure 7:
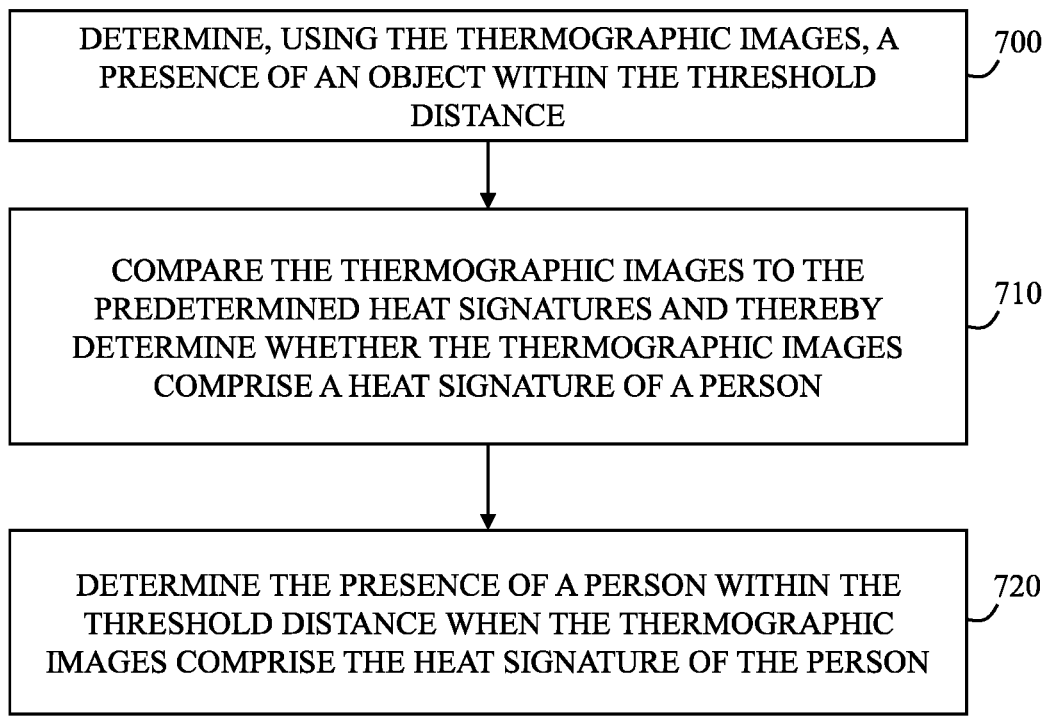
FIG. 7 illustrates exemplary operational steps of the proximity detecting headphone device according to yet still other embodiments.

In other embodiments. thermographic images are utilized to determine object proximity as well as the presence of persons. FIG. 7 illustrates exemplary operational steps of PDHD 110 according to yet still other embodiments. Here, the proximity data includes thermographic images captured via thermographic camera 120. In addition, data store 122 includes predetermined heat signatures 124 (e.g., predetermined thermographic images) of one or more vehicles, persons, and/or non-human mammals. In yet still other embodiments, applicable vehicles include, but are not limited to, cars, trucks, motorcycles, etc. Applicable persons include, but are not limited to, male/female, adults, children, etc. Applicable non-human mammals include, but are not limited to, dogs, cats, etc.

At step 700, the captured thermographic images are utilized to determine the presence of an object within the threshold distance. For example, the presence of an object is determined when a statistically significant heat signature in the thermographic image is present relative to background within threshold distance 300. At step 710, the thermographic images are compared to the predetermined heat signatures to thereby determine whether the captured thermographic images comprise a heat signature of a person. For example, compare the statistically significant heat signature to predetermined heat signatures 124. At step 720, the presence of a person within the threshold distance is determined when the thermographic images comprise the heat signature of the person.

Figure 8:
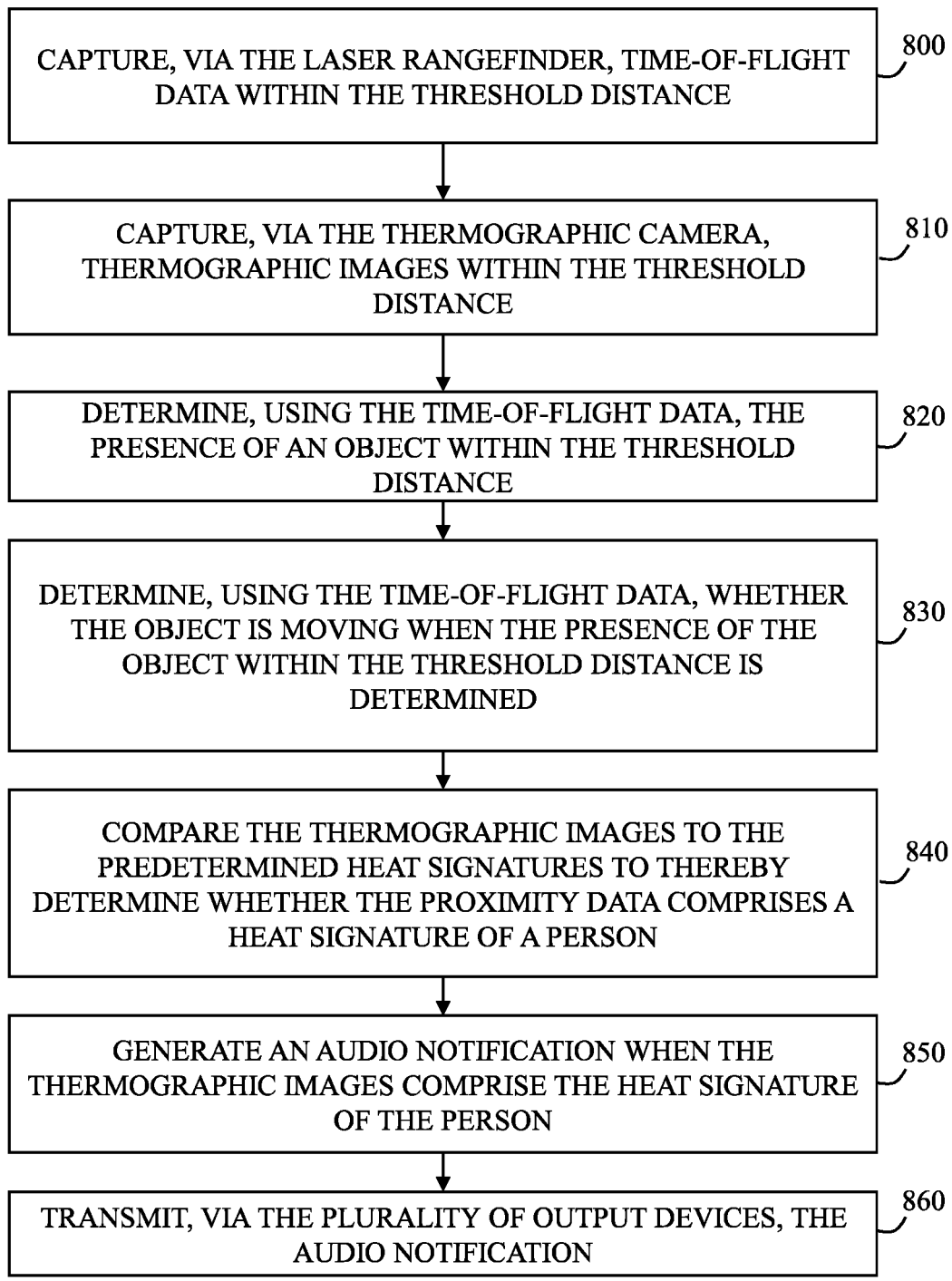
FIG. 8 illustrates exemplary operational steps of the proximity detecting headphone device according to some embodiments.

In other embodiments, time-of-flight data as well as thermographic images are utilized to determine the presence of persons within the threshold distance. For example, use of time-of-flight data and thermographic images can increase the probability of accurately detecting the presence of a person within threshold distance 300. FIG. 8 illustrates exemplary operational steps of PDHD 110 according to some embodiments. Laser rangefinder 118 captures time-of-flight data within threshold distance 300 (Step 800). Thermographic camera 120 captures thermographic images within threshold distance 300 (Step 810). The time-of-flight data is used to determine the presence of an object within threshold distance 300 (Step 820). The time-of-flight data is used to determine whether the object (e.g., person 310) is moving when the presence of the object within threshold distance 300 is determined (Step 830). The thermographic images are compared to predetermined heat signatures 124 to thereby determine whether the thermographic images comprise a heat signature of a person (Step 840). An audio notification is generated when the thermographic images include the heat signature of a person (Step 850).

Figure 9:
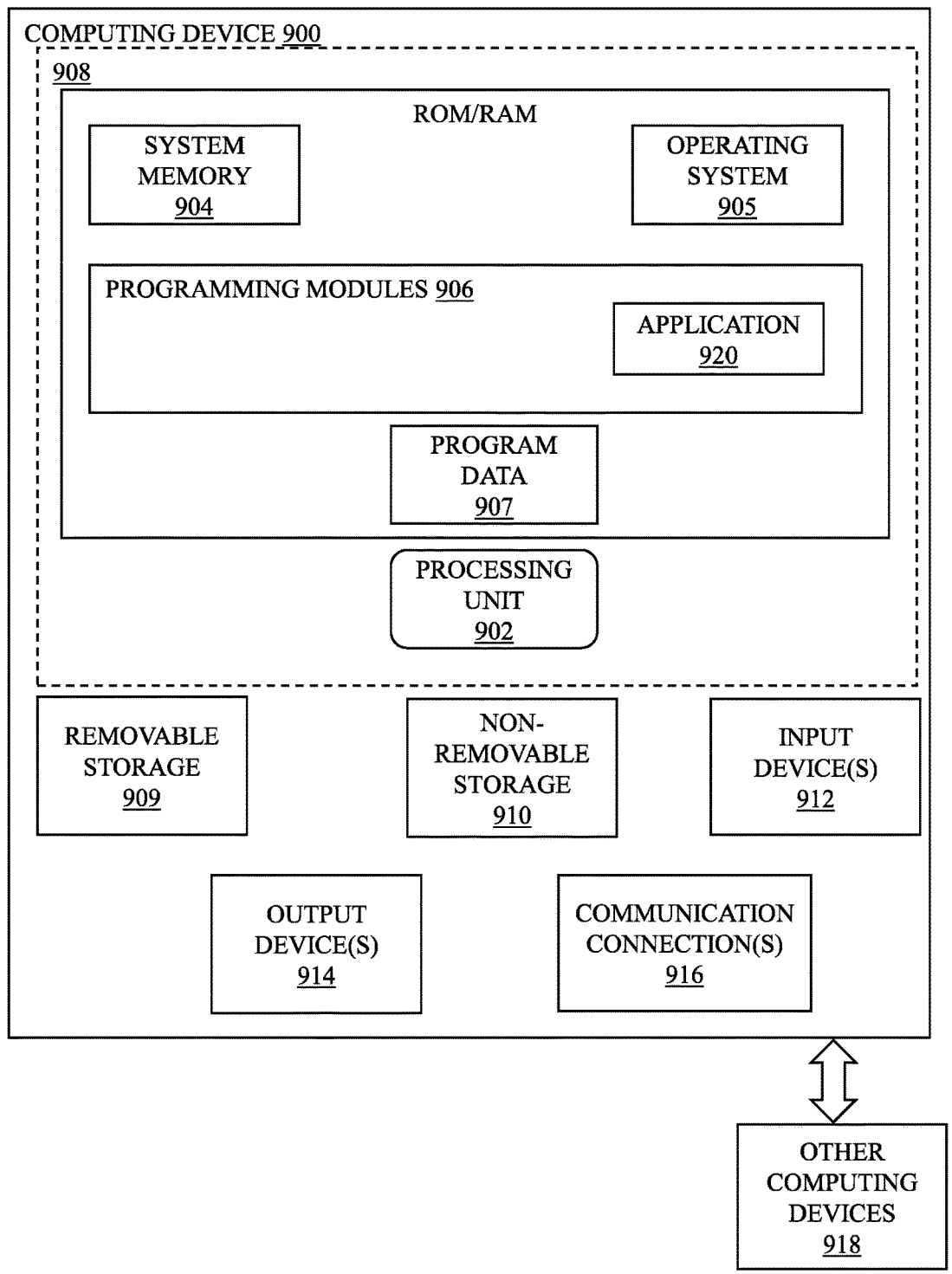
FIG. 9 depicts a system configuration according to other embodiments.

With reference to FIG. 9, a system consistent with an embodiment of the disclosure may include a computing device or cloud service, such as computing device 900. Computing device 900 can represent PDHD 110 and/or computing device 130. In a basic configuration, computing device 900 may include at least one processing unit 902 (e.g., control circuit 112) and a system memory 904. Depending on the configuration and type of computing device, system memory 904 may comprise, but is not limited to, volatile (e.g. random-access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In one embodiment, programming modules 906 may include machine learning module. Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer-readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, a location sensor, a camera, a biometric sensor, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902 (e.g., control circuit 112), programming modules 906 (e.g., application 920 such as a media player) may perform processes including, for example, one or more stages of methods, algorithms, systems, applications, servers, databases as described above. The aforementioned process is an example, and processing unit 902 (e.g., control circuit 112) may perform other processes. Other programming modules that may be used in accordance with embodiments of the present disclosure may include machine learning application.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the disclosure has been explained in relation to its preferred embodiment, it is to be understood that many other possible modifications and variations can be made without departing from the spirit and scope of the disclosure.

The invention claimed is:

1. A proximity detecting headphone device ("PDHD") comprising:
    a proximity sensor;
    a plurality of output devices;
    a control circuit;
    a communications device;
    the proximity sensor comprising a laser rangefinder and a thermographic camera;
    the laser rangefinder being configured to capture time-of-flight data of an object;
    the thermographic camera being configured to capture thermographic images of the object;
    the control circuit being communicatively coupled to the proximity sensor, the plurality of output devices and a data store;
    the data store comprising predetermined heat signatures, wherein the predetermined heat signatures comprise a predetermined heat signature of a vehicle and a predetermined heat signature of a person;
    wherein the control circuit is configured to:
        capture, via the proximity sensor, proximity data of the object within a threshold distance of the PDHD, wherein the proximity data comprises the time-of-flight data captured via the laser rangefinder and the thermographic images captured via the thermographic camera;
        determine, using the proximity data, a presence of the person or the vehicle within the threshold distance;
        in determining the presence of the person within the threshold distance:
            determine, using the time-of-flight data and the thermographic images, a presence of the object within the threshold distance;
            determine, using the time-of-flight data, whether the object is moving, and determine whether the thermographic images comprise a heat signature of the person by comparing the thermographic images to the predetermined heat signature of the person, when the presence of the object within the threshold distance is determined; and
            determine that the object is the person when the object is determined to be moving and when the thermographic images comprise the heat signature of the person;
        in determining the presence of the vehicle within the threshold distance:
            determine, using the time-of-flight data and the thermographic images, the presence of the object within the threshold distance;
            determine, using the time-of-flight data, whether the object is moving, and determine whether the thermographic images comprise a heat signature of the vehicle by comparing the thermographic images to the predetermined heat signature of the vehicle, when the presence of the object within the threshold distance is determined; and
            determine that the object is the vehicle when the object is determined to be moving and when the thermographic images comprise the heat signature of the vehicle;
        generate an audio notification when the presence of the person or the vehicle within the threshold distance is determined, wherein the audio notification comprises an alerting statement; and
        transmit, via the plurality of output devices, the audio notification;
    wherein the PDHD is configured to communicate with a computing device via the communications device;
    the PDHD being in the form of an over-the-head headphone;
    the over-the-head headphone comprising a band configured to be positioned over a human head;
    each of the plurality of output devices being positioned on an end of the band; and
    the proximity sensor being positioned on a middle section of the band.

* * * * *